United States Patent Office 2,831,841
Patented Apr. 22, 1958

2,831,841

TREATMENT OF ACRYLAMIDE POLYMERS

Giffin D. Jones, Midland, Mich., assignor to The Dow Chemical Company, Midland, Mich., a corporation of Delaware No Drawing. Application March 19, 1956
Serial No. 572,199

10 Claims. (Cl. 260—89.7)

This invention concerns the treatment of acrylamide polymers and particularly the treatment of such polymers with ammonia and amines. It especially concerns a method of effecting a substantial reduction of residual monomeric acrylamide in such polymers.

Acrylamide polymers, as used herein, refer to the homopolymer of acrylamide and to water-soluble copolymers of acrylamide chemically combined with at least one other monoethylenically unsaturated organic compound copolymerizable therewith. Such polymers are widely used industrial compositions.

Prominent among their uses is that as a flocculating agent for finely divided inorganic matter in aqueous suspensions. Copending application Serial No. 438,612, filed June 22, 1954, and No. 522,864, filed July 18, 1955, teach the use of water-soluble acrylamide polymers in dilute aqueous solutions as additaments in such aqueous suspensions. A recommended range for the concentration of the treating solution is 0.005 to 0.5 percent. These polymers exhibit a marked beneficial effect on the rate of settling and subsequent ease of separation of the inorganic matter from the aqueous medium.

However, the above polymers usually contain, incident to their manufacture, a small amount, e. g. from less than 1 to about 5 percent by weight, of residual or unpolymerized monomeric acrylamide. The latter is toxic and its presence in any appreciable amount in the polymer excludes its use from many of the applications for which it is otherwise well suited. The reduction of the residual monomeric acrylamide in such polymer is therefore highly desirable because obviously, the value of even mildly toxic industrial materials, which are used for purposes not dependent upon their toxicity, is enhanced by a marked reduction in the toxicity. An outstanding industrial application of acrylamide polymers as flocculating agents is in the removal of finely divided inorganic solids from aqueous solutions of valuable minerals, e. g. from solutions of uranium salts in recovery processes associated with uranium mining operations. Furthermore, since polymers of acrylamide are flocculants of high efficacy, their possible use in water, intended for animal and human consumption, is readily conceivable. An increase in the margin of safety of such waters from a toxicological point of view, when thus subjected to flocculation by acrylamide polymers is highly desirable.

Polymers, including both polyacrylamide and water-soluble copolymers composed essentially of acrylamide and one or more monomers copolymerizable therewith as defined above, in which any residual unpolymerized monomeric acrylamide has been rendered substantially impotent by having been treated with a detoxifying agent, viz. ammonia or a soluble amine as described hereinafter, may be dissolved in an aqueous medium and added to aqueous suspensions as flocculating agents in a manner described in copending applications Ser. No. 438,612, filed June 22, 1954, and Ser. No. 570,810, filed March 12, 1956.

Methods of preparing monomeric acrylamide which are suitable for large scale industrial production are well known. French Patent 898,275, granted April 8, 1945, presents a method of preparing acrylamide wherein acrylonitrile in water is hydrolyzed by sulfuric acid at preferably about 100° C. in the presence of copper powder, which acts as a polymerization inhibitor; the reaction mixture is neutralized and the acrylamide recovered as the reaction product.

The polymerization of acrylamide to the homopolymer, and with copolymerizable monomers to copolymers, is also well known. British Patent 475,671 describes the method of making polyacrylamide wherein acrylamide, dissolved in water, and having had added thereto acrylic acid, is polymerized by heating for about an hour at about 60° C. in the presence of potassium persulfate as catalyst. Polymers having an average molecular weight of 1,000,-000 and over are obtainable by this method and modifications thereof.

An object of the invention is to provide a method of treating acrylamide polymers containing small amounts of unreacted or residual monomer which method substantially reduces the amount of such monomer in the polymer, thereby rendering it less toxic. Another object is to provide treating agents and a method of treating aqueous solutions of acrylamide polymers containing monomeric acrylamide, which method effectively frees the polymer solution from monomeric acrylamide. A further object is to provide treating agents and a method for treating polyacrylamide and the copolymers described above which render the polymer and materials treated by such polymer free, or substantially free, from monomeric acrylamide. Other and related objects will appear from the following description of the invention.

According to the invention, polyacrylamide and copolymers containing acrylamide chemically combined with a monomer copolymerizable therewith, and containing small amounts of unpolymerized acrylamide incident to its manufacture, are treated with a nitrogen compound, such as ammonia or a water-soluble primary or secondary acyclic, carbocyclic, or saturated heterocyclic amine. By such treatment the residual monomeric acrylamide is greatly reduced or rendered ineffectual by converting it to products which are substantially non-toxic.

I prefer to conduct the treatment in the presence of water, preferably in an amount of at least 15 percent of the weight of the polymer, because the swelling effect produced by the water causes the polymer to be more permeable and therefore more receptive to the treating agent. However, ammonia or a gaseous amine under pressure sufficiently swells the polymer without the aid of water for the purposes of the treatment. Furthermore, if the amine is in liquid form, an excess of amine may be used without water, the excess causing a swelling effect; thereafter the excess amine may be removed by drying or by other conventional means.

The invention encompasses ammonia and water-soluble primary and secondary amines having a solubility in water as defined by Kamm, in Qualitative Organic Analysis, 2nd ed., 228, 234 (1938) in Group I, Subgroup 8, and Group II, Subgroup 3, viz., a solubility of at least 1 gram of the amine in 30 grams of water at 20–25° C.

Suitable amines are exemplified by methylamine, ethylamine, butylamine, dimethylamine, diethylamine, cyclohexylamine, ethanolamine, diethanolamine, isopropanolamine, benzylamine and morpholine. Any excess of those amines which present a toxic hazard in themselves or any toxic chemical adducts formed thereby must be entirely removed from the treated polymer. For example, piperidine is not a preferred amine.

It is to be noted that when at least a mole of caustic or other inorganic base is added per mole or residual acrylamide and thereafter the resulting reaction mixture heated moderately until the pH value drops to that of the hydrolysis products, ammonia is formed thereby and reacts with the monomer. Such formation of ammonia in situ is an embodiment of the invention. The following equation represents the reaction thought to take place:

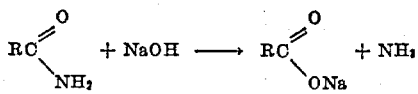

The polymers to be treated according to the invention are polyacrylamide, and water-soluble copolymers containing acrylamide chemically combined with one or more monomers copolymerizable therewith, and containing a small amount of residual or unpolymerized acrylamide incident to their manufacture. The permissible percentage of the copolymerizable monomer is dependent upon the hydrophilic character of the polymerized units of comonomer in the copolymer. Those copolymerizable monomers having such hydrophilic character are those that form homopolymers which are miscible or soluble in water in any proportions. These monomers may be used up to 90 weight percent with a corresponding proportion as small as 10 percent of acrylamide. On the other hand, those monomers which form relatively mater-immiscible or insoluble homopolymers may be used only to the extent that a water soluble copolymer results when copolymerized with acrylamide. Such copolymers are necessarily limited to those containing a major proportion of acrylamide.

Examples of the water-miscible monomers which may be used in proportions up to 90 percent by weight of the acrylamide copolymer for the purpose of my invention are acrylic acid, methacrylic acid, vinylsulfonic acid, and the vinyl benzyltrimethylammonium chloride monomer copolymerized as described in copending application No. 556,783, filed January 3, 1956, and those monomers containing the sulfonate group copolymerized with acrylamide as described in my copending application No. 570,810, filed March 12, 1956, viz., vinyltoluene-alpha-sulfonic acid, vinylbenzenesulfonic acid, and alkali and soluble alkaline earth salts thereof. Examples of relatively immiscible monomers which are copolymerizable with acrylamide, and therefore limited to a minor proportion of the copolymer encompassed by the instant invention are vinyl acetate, vinyl chloride, vinylidene chloride, acrylonitrile, methyl acrylate, methyl methacrylate, and styrene. Polyacrylamide and the above copolymers fall within the purview of the treatment herein described.

Monomeric acrylamide and polymers of acrylamide, all of which had been treated with ammonia as the detoxifying agent according to my invention, were fed, i. e., given by oral intubation, to albino rats, both by a long range or chronic feeding test and by repeated accelerated or acute feeding tests. Untreated monomeric acrylamide and untreated polymers of acrylamide were also fed in equal amounts to other rats which were of a substantially equal physical status and condition. Toxic effects were conspicious in all rats to which the untreated monomer and untreated polymer were fed in sufficiently large doses to provide toxic amounts of the monomer. On the other hand, no toxic effects were detected in the rats to which the monomer and polymer, treated according to the invention, were fed, even though very large doses of such treated monomer and polymer were fed. The results of all feeding tests conducted were consistent and uniform in showing a marked reduction in toxicity in the treated monomer and polymer. Table I below shows the effects of feeding equal ingesting portions of each of the following samples of polyacrylamide in the daily diet of albino rats over a period of thirty-two days.

TABLE I

| Sample Fed | Percent Monomeric Acrylamide | Effect on Rats |
|---|---|---|
| (a) Ammonia-treated polyacrylamide | 0.07 | No ill effects. |
| (b) Untreated polyacrylamide | 0.80 | Marked toxic effects. |
| (c) Original sample (b), above, which had been subsequently ammonia-treated. | 0.11 | No ill effects. |
| (d) Original sample (a) above but to which acrylamide monomer added to make monomer content 0.80%. | 0.80 | Marked toxic effects. |
| (e) Original sample (a) but to which acrylamide monomer added to make monomer content 0.30%. | 0.30 | Slight indications of toxic effect. |

Table I conveys convincing evidence of the contrasting physiological effects on two groups of rats when one group was fed untreated polyacrylamide and the other group was fed portions of the same acrylamide which had been detoxified by treatment with ammonia as the nitrogen treating compound.

Untreated monomeric acrylamide and monomeric acrylamide, which had been treated with amines according to my invention, were given by oral intubation to different groups of albino rats. The acrylamide treated according to my invention was found to be approximately 1/100 as toxic to rats as the untreated acrylamide, with the exception of piperidine which showed some toxic effects due to the piperidine itself. In the case of piperidine, the toxicity of the treated monomeric acrylamide was about 1/10 that of the untreated.

The biological effects of the invention were also evaluated by injecting, intraperitoneally, untreated acrylamide monomer to one group of cats and acrylamide monomer treated according to my invention to a second group of cats. The treated acrylamide was injected in dosages amounting to ten times the weight of the untreated acrylamide dosages injected. Despite this test being an especially rigorous one, no symptoms of poisoning appeared except in the case of the cats into which the piperidine-treated acrylamide was injected. These cats, receiving the piperidine-treated acrylamide showed marked symptoms of poisoning of an anesthetic nature (as contrasted to the neurotoxic effect which characterizes acrylamide).

In practicing my invention, the ammonia, or amine if sufficiently volatile, may be passed in gaseous form through a mass of the acrylamide polymer. For purposes of the treatment the polymer may be dissolved in water or it may be slurried in a mixture of water and lower monohydric alcohols, or it may be dry if superatmospheric pressure is used. The gas may be dissolved in a suitable liquid vehicle, e. g. water, before treating the polymer with it. If the treating agent is normally in liquid form, it may be used directly as a liquid in concentrated form, or may be diluted with water or a water-miscible liquid such as a lower aliphatic alcohol.

The temperature may be room temperature, but the treatment time is conveniently reduced at a temperature up to about 125° C. A preferred range of operation is 80° to 100° C. Higher temperatures may be used but are not recommended because degradation or cross-linking of the polymer may result. The reaction time is dependent upon the treating conditions and the treating agent used and is predetermined somewhat in accordance with the use to be made of the treated polymer. Fifteen minutes may be sufficient in some instances, particularly when advanced temperatures are used, whereas 24 hours or even longer may be considered advisable in others when room temperature is used.

The length of treating time may be guided by a determination of the acrylic groups remaining by means of a test such as the bromate-bromide titration test. This is a test of unsaturation, the details of which may be found in Ind. Eng. Chem., Anal. Ed. 7, 59 (1935).

It is to be noted, however, that all unsaturation is not due to acrylamide. Some hydrolysis of both the polymer and monomer occurs during the ammonia or amine treatment. Hydrolysis of the monomer produces acrylate ion which reacts more slowly in respect to the addition of ammonia or amines to the double bond than does acrylamide. It does not, however, possess the toxicity of acrylamide, and, therefore it is immaterial whether or not the addition is complete in respect to the acrylate ion. It might be noted, however, that the hydrolysis is not selective enough of the monomer in preference to the polymer to be considered a satisfactory method for removing the monomer. Hydrolysis may be shown by acid-base titration which shows the increase in the carboxyl groups present. However, to differentiate between the acrylate and the residual acrylamide in the treated polymer, the selective removal of the acrylate ion by means of an anion exchange resin is suggested.

Upon completion of the reaction, the treated polymer is freed of excess treating agent and from the reaction medium by drying or by other known means. The reaction between the acrylamide and ammonia or an amine is thought to be one of addition in which amino propionamides are formed. The following reactions are postulated as being those which take place. Such postulations, however, are not to be construed as limitations upon the utility or novelty of the invention.

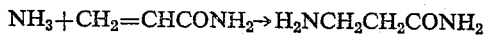

the primary amine

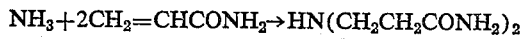

the secondary amine

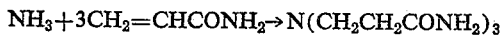

the tertiary amine.

It is quite probable that the secondary and tertiary amines do not form directly, but that the secondary amines form as a result of one mole of the already formed primary amines reacting with a second mole of the acrylamide; and that the tertiary amine is formed as a result of a mole of the secondary amine reacting with another mole of the acrylamide. The following reactions are thought to be likely possibilities.

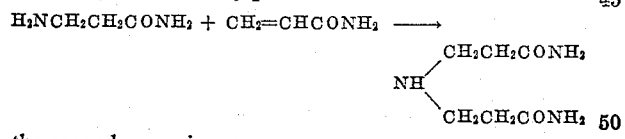

the secondary amine

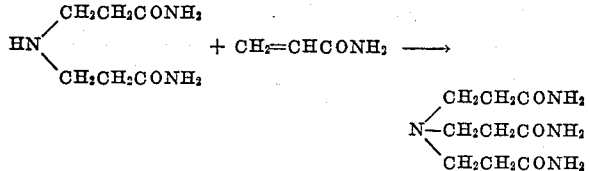

the tertiary amine.

The aminopropionamides are known to be non-toxic. Although some acrylic groups are present (as presented in the examples appearing hereinafter) following the treatment of the polymer with ammonia or an amine having a labile hydrogen atom, it has been shown conclusively by conductivity tests and by passing aqueous solutions of the treated polymer through ion exchange resins, which remove acrylate ions but not acrylamide, that the major percentage of the unsaturated groups remaining are acrylate ions, and not acrylamide. The acrylate ions are known to be non-toxic.

The following examples illustrate the application of the principle of the invention; they are not, however, to be construed as limiting its scope.

The polymer used in Examples 1 and 4 was polyacrylamide made according to a conventional method on a mass production line.

Example 1

Polyacrylamide in the amount of 20 grams and analyzing 1.17 percent residual monomer, calculated as acrylamide, was slurried with 75 ml. methanol and 25 ml. water in a covered vessel. Ammonia gas at room temperature and atmospheric pressure was bubbled through the slurry. After the reaction times which are set out immediately below, samples were taken and the per cent monomer, calculated as acrylamide, was determined.

| Reaction Time | Percent Monomer |
| --- | --- |
| 20 minutes | 0.205 |
| 1 hour | 0.138 |
| 25 hours | 0.099 |

Example 2

A second sample of polyacrylamide which analyzed 3.18 percent residual monomer was placed in a steel bomb; ammonia gas at room temperature was admitted under a pressure of approximately 135 p. s. i. for 16 hours. The polymer became compact and swelled into a somewhat tough mass. Residual monomer was determined to be 0.284 percent at the end of that time.

Example 3

Another sample of the polyacrylamide used in Example 2 containing 3.18 percent of acrylic monomer calculated as acrylamide, was placed in a steel bomb and treated with ammonia under a pressure of approximately 135 p. s. i. as in Example 2, but at a temperature of 90° to 100° C. for 16 hours. The percent monomer was reduced to 0.36 percent by the ammonia treatment. At the temperature used here, the polymer had not become compacted together as in Example 2.

Example 4

To show the effect of treating acrylamide monomer with amines, various amines were used as set forth, together with the results obtained, in Table II. The acrylamide monomer (100 g.) was dissolved in 100 ml. of water to which 10 p. p. m. of sodium nitrite had been added to discourage polymerization. The treating agent was added in liquid form at 80° to 90° C. over a steam bath for 16 hours. A distillation assembly equipped with an aspirator vacuum for the removal of water and excess amines during treatment was used.

TABLE II

| Treating Agent | Weight in Grams | Percent Monomer after Treatment[1] |
| --- | --- | --- |
| Methylamine, 25% in water | 286.0 | 0.06 |
| Ethylamine | 70.0 | 0.14 |
| Ethanolamine | 94.5 | 0.22 |
| Morpholine | 135.0 | 0.15 |
| Piperidine | 132.0 | 0.15 |

[1] The percent monomer is based upon the weight of the final product after treatment.

Examples of the products which are thought to be among those formed are the addition products of amines and acrylamide below:

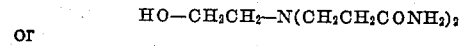

or

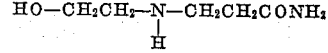

in the case of ethanolamine, and

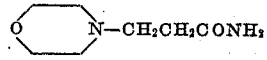

in the case of morpholine.

A representative portion of 75 grams of a laboratory batch of polyacrylamide was agitated with the weight of ammonia or amines dissolved in water or in undiluted liquid form as shown in Table III; Table III also shows the results obtained. The treatment was carried out for one-half hour at 100° C.

TABLE III

| Treating Agent Used | Treating Agent in Grams | Percent residual monomer remaining [1] |
|---|---|---|
| (Untreated) | None | 3.21 |
| Ammonia, 28% in water | 3.05 | 0.81 |
| Methylamine, 25% in water | 6.20 | 0.21 |
| Ethanolamine | 3.10 | 0.36 |
| n-Butylamine | 3.65 | 0.45 |
| Morpholine | 4.35 | 0.18 |

[1] The percent residual monomer was calculated on the weight of the solids of the dried treated product after treatment.

*Example 5*

A portion of polyacrylamide, prepared in the laboratory, was heated on a steam bath and subjected to a flow of ammonia gas. The percent of monomer in the untreated polymer was 3.21 percent. After several hours treatment, during which the percent monomer had fallen to 0.147, an aqueous solution of the polymer was passed through a bed of mixed anion and cation exchange resins. The residual monomer was found to have been reduced to 0.017 percent by passing through the resins. Since the acrylate ion was removed by the resins and the acrylamide was not, the reduction in monomeric content is attributed to its consisting largely of acrylate ions which are non-toxic rather than of unreacted acrylamide. This condition may in part be explained by the fact that ammonia and amines react much faster with acrylamide than they do with acrylate ions.

*Example 6*

A novel polymer of acrylamide and vinylbenzyltrimethylammonium chloride having a composition as described in copending application Ser. No. 556,783, filed January 3, 1956, was prepared and treated with ammonia. It was found that such a copolymer responded equally well to the ammonia treatment as did the polyacrylamide.

The hereinabove examples present clearly the effectiveness of the invention. They demonstrate that ammonia and primary and secondary amines, including both aliphatic and saturated heterocyclic amines, effectively reduce the acrylamide monomer in an acrylamide polymer when such polymer is treated according to the procedure herein described. The examples are to be construed as effective ways of practicing the invention and are not to be construed as defining its scope.

Having thus described my invention, what I claim and desire to protect by Letters Patent is:

1. A method of treating a water-soluble acrylamide polymer consisting essentially of at least 10 percent by weight of acrylamide chemically combined with from 0 to 90 percent by weight of at least one other monoethylenically unsaturated organic compound copolymerizable therewith and having an appreciable amount of monomeric acrylamide intimately associated therewith, to reduce the amount of monomeric acrylamide associated with the polymer which comprises treating said acrylamide polymer with at least one nitrogen compound selected from the class consisting of ammonia and primary and secondary amines having a solubility of at least 1 gram thereof in 30 ml. of water at a temperature of 25° C.

2. The method of claim 1, wherein the nitrogen compound is ammonia.

3. The method of claim 1, wherein said amine is an alkylamine.

4. The method of claim 1, wherein said amine is an alkanolamine.

5. The method of claim 1, wherein the amine is a saturated heterocyclic amine.

6. The method of claim 1, wherein the alkylamine is methylamine.

7. The method of claim 1, wherein the alkylamine is ethylamine.

8. The method of claim 4, wherein the alkanolamine is ethanolamine.

9. The method of claim 5, wherein the heterocyclic amine is morpholine.

10. A water-soluble acrylamide polymer consisting essentially of at least 10 percent acrylamide chemically combined with from 0 to 90 percent by weight of at least one other monoethylenically unsaturated organic compound copolymerizable therewith and containing acrylamide adducts in amounts up to 5 percent by weight of the polymer, said adducts being formed by reacting unpolymerized monomeric acrylamide in said polymer with a nitrogen compound selected from the class consisting of ammonia and a primary and secondary amine having a solubility of at least 1 gram in 30 milliliters of water at 25° C.

References Cited in the file of this patent

UNITED STATES PATENTS

| 2,300,566 | Hahn et al. | Nov. 3, 1942 |
| 2,469,696 | Minsk et al. | May 10, 1949 |
| 2,486,190 | Minsk et al. | Oct. 25, 1949 |
| 2,486,192 | Minsk et al. | Oct. 25, 1949 |
| 2,611,763 | Jones | Sept. 23, 1952 |
| 2,749,331 | Breslow | June 5, 1956 |